Nov. 26, 1957                A. C. VOIGT                    2,814,082
       MOLD HANDLING APPARATUS FOR TRANSPORTING SECTIONAL MOLDS
Filed Dec. 24, 1954                                    3 Sheets-Sheet 1

INVENTOR.
AUGUST C. VOIGT
BY Paul O. Pippel
ATTY.

Nov. 26, 1957  A. C. VOIGT  2,814,082
MOLD HANDLING APPARATUS FOR TRANSPORTING SECTIONAL MOLDS
Filed Dec. 24, 1954  3 Sheets-Sheet 2

INVENTOR.
AUGUST C. VOIGT
BY Paul O. Pippel
ATTY.

Nov. 26, 1957 A. C. VOIGT 2,814,082
MOLD HANDLING APPARATUS FOR TRANSPORTING SECTIONAL MOLDS
Filed Dec. 24, 1954 3 Sheets-Sheet 3
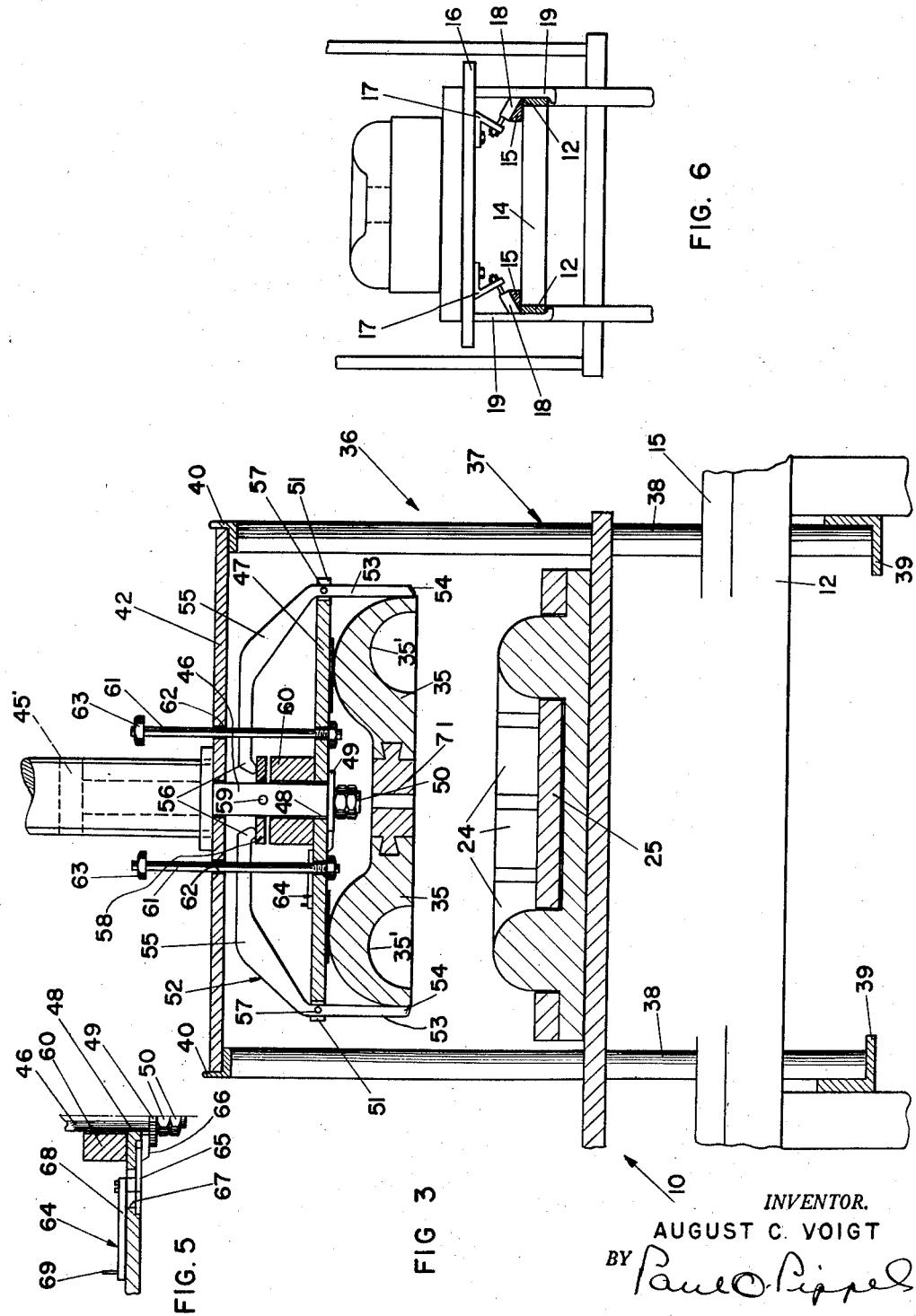
INVENTOR.
AUGUST C. VOIGT
BY Paul O. Pippel
ATTY.

United States Patent Office 2,814,082
Patented Nov. 26, 1957

2,814,082

MOLD HANDLING APPARATUS FOR TRANSPORTING SECTIONAL MOLDS

August C. Voigt, Evergreen Park, Ill., assignor to International Harvester Company, a corporation of New Jersey Application December 24, 1954, Serial No. 477,487

14 Claims. (Cl. 22—31)

This invention relates to an apparatus for handling molds. More specifically, this invention relates to a handling device for transporting a sectional mold from a mold assembly fixture to a drag, or lower-supporting portion, of a mold.

In the manufacture of torque converters, and similar rotary-fluid motors, difficulties have been encountered in casting the parts. In the casting of such units, individual sectional cores are provided, these cores being assembled to form a unitary core-mold structure. The individual cores must be accurately positioned in relative relation, so that the spaces therebetween are within very close tolerances. Furthermore, in this relatively spaced position, they must then be permanently assembled, so that this spacing is held during the casting operation. Furthermore, great difficulties have been encountered in transporting the assembled unitary core mold from the assembly fixture to the drag portion of the mold, since the unitary mold structure is quite fragile and will crumble under relatively slight impacts. It is therefore a prime object of this invention to provide an improved device for handling foundry molds, particularly of the plaster-type of core-mold assembly utilized in the foundry process of casting torque converters, or similar fluid motors having circumferentially spaced vanes necessitating individual cores assembled together prior to the casting process.

A still further object is to provide an improved core-mold handling device, wherein the core molds may be assembled on an assembly fixture into a unitary structure, the said molds then being lifted as a unitary structure from the assembly fixture and transported by the lifting device to a mold drag for subsequent casting.

A still further object is to provide an improved assembly fixture for assembling a plurality of core molds into a unitary structure, the assembly fixture including means for maintaining the individual cores in relatively fixed relation and including a stripper plate for lifting the unitary core-mold structure from a spacer element.

A still further object is to provide an improved combination of an assembly fixture, associated with a core-lifting device, adapted to lift the core from the assembly fixture to a vertical position, whereupon the assembly fixture may be moved on a movable table from underneath the lifting device, and whereupon a mold drag positioned on the table may be disposed beneath the lifting device for receiving the core from the lifting device.

A still further object is to provide an improved lifting device for lifting an assembled core from a core assembly fixture, the device including means for gripping the core at a plurality of spaced points, so that the core is lifted equally on all sides; the said lifting device including means whereby the core may be gently deposited upon a mold drag without injuring the frangible core assembly.

These and further objects will become more readily apparent from a reading of the specification when examined in connection with the accompanying sheets of drawings.

In the drawings:

Figure 3 is a cross-sectional view through a lifting device for lifting and handling molds;

Figure 5 is an enlarged cross-sectional view, in detail, showing a stop slide forming part of a lifting device; and Figure 6 is a cross-sectional view taken substantially along the line 6—6 of Figure 1.

Figure 1:
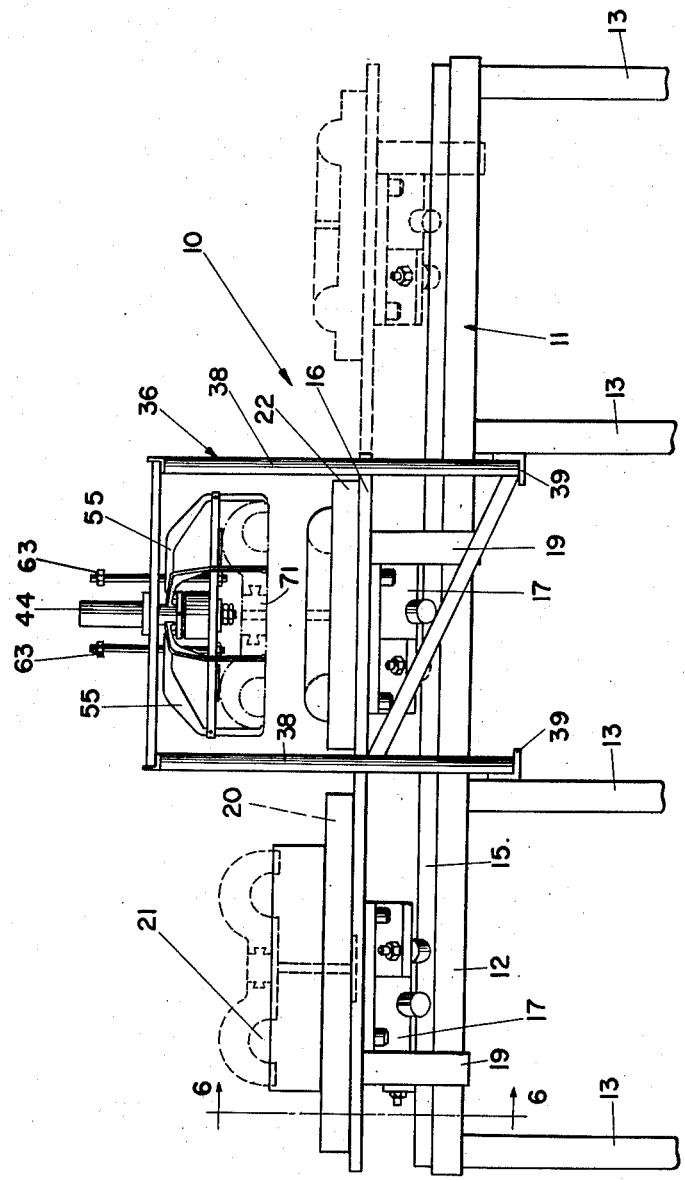
Figure 1 is a side-elevational view of an apparatus, or device, for handling foundry molds.

A mold-handling apparatus is generally referred to by the reference character 10, the apparatus 10 including a supporting structure 11. The supporting structure 11 includes a plurality of longitudinally extending members 12 suitably supported on legs 13. A plurality of laterally extending members 14 are connected to the longitudinal members 12 to keep the same in substantially parallel spaced relation. Each of the longitudinally extending members 12 has supported thereon a tapered track 15, particularly shown in Figure 6. A platform 16 is movably mounted on the tracks 15 by means of a plurality of roller carriages 17, having suitable roller members 18 supported on the tracks 15. The platform 16 is limited in its movement on the tracks 15 by means of a plurality of longitudinally spaced stop members 19.

As particularly indicated in Figure 1, a mold-drag device 20 is positioned on the platform 16. The mold drag 20 (or lower part of the mold) includes a conventional recessed receiving surface 21, this surface being adapted, as will be described later, to receive the cores so as to make up a complete lower section of a mold. A mold assembly fixture 22 is laterally spaced and positioned on the platform 16. The mold assembly fixture 22 comprises an annular, or circular, base member 23 having disposed thereon a plurality of arcuate projections 24 positioned in circumferentially spaced relation. The arcuate projections 24 also may be referred to as spacer elements, adapted to engage and position a plurality of mold sections in relative fixed relation. A stripper plate 25 is supported on the base member 23. The stripper plate 25 includes a mold-carrying surface 26, upon which a plurality of individual mold sections may be positioned. The stripper plate 25 also is suitably apertured, or provided, with openings 27, through which the arcuate projections 24 extend and project upwardly with respect thereto. The base member 23 is provided with a central opening 28 through which a piston rod 29 projects. The piston rod 29 is suitably connected at one end to the stripper plate 25, as indicated at 30. A fluid-extensible device, in the form of a cylinder 31, is suitably connected to the underneath side of the base member 23, the piston rod 29 being connected to a piston 32 reciprocally positioned within the cylinder 31. An air nipple, or inlet connection, 33 is suitably provided on the cylinder 31 for permitting the inlet of air into said cylinder. Bolts 34 are shown on the underneath side of the base member 23, these bolts being provided to suitably support the fixture 22 on the platform 16.

Figures 2, 4:
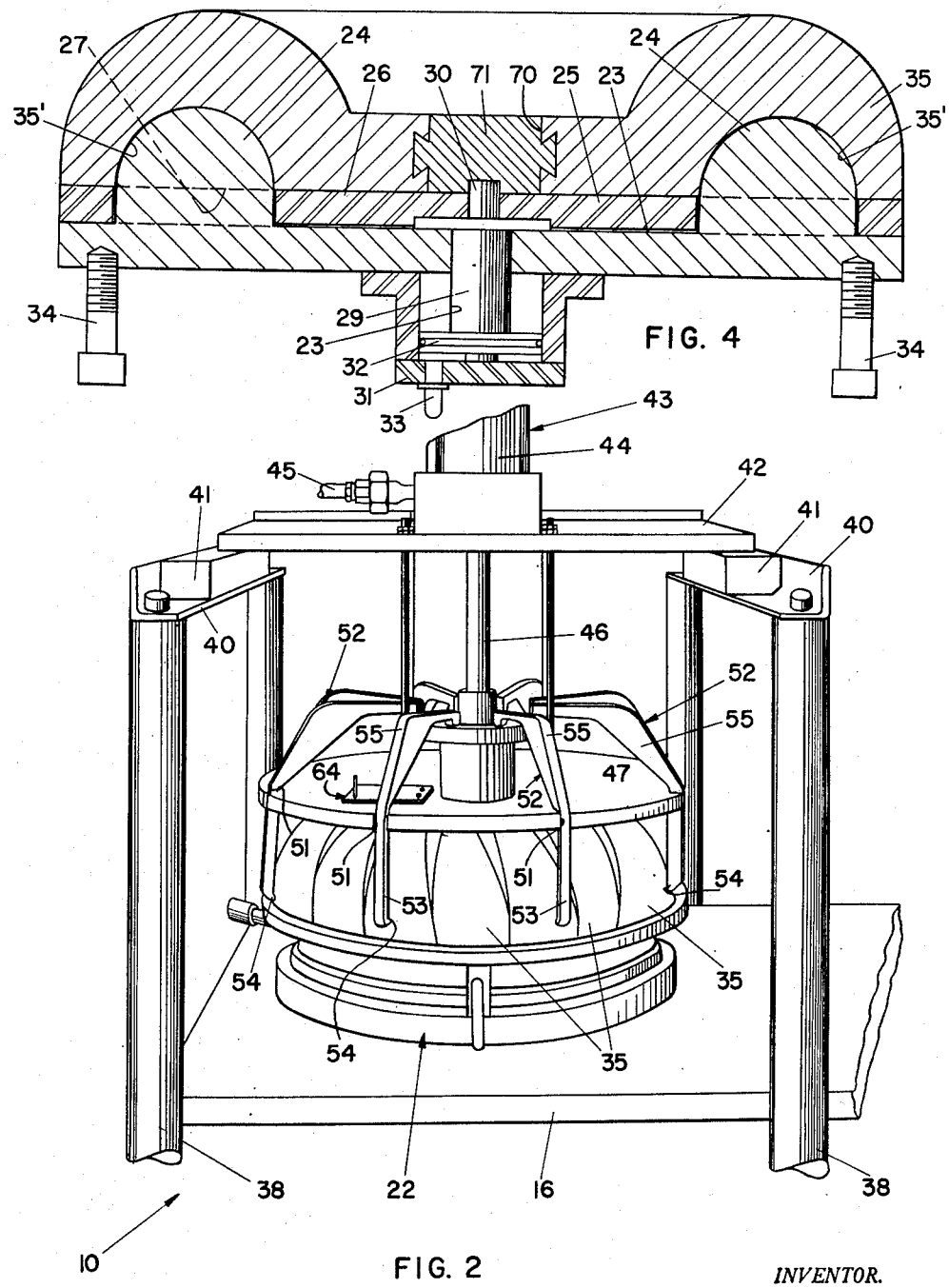
Figure 2 is a perspective view of a mold-handling apparatus, particularly showing a lifting device for lifting molds from an assembly fixture.
Figure 4 is a cross-sectional view through a mold assembly fixture.

A plurality of mold sections 35, as best shown in Figure 2, are seated on the assembly fixture 22. These mold sections 35 are utilized in connection with assembling a mold for casting a torque-converter part, the said part including a plurality of internal circumferentially disposed vanes. The mold sections, generally, are made from a frangible plaster material having properties resistant to expansion and contraction. The mold sections 35 are retained on the assembly fixture 22 against endwise displacement, since the arcuate projections 24 suitably mate with arcuate recesses 35', as best shown in Figure 3.

A lifting device, best shown in Figures 1, 2, and 3, is generally indicated by the reference character 36. The lifting device 36 comprises a frame 37 consisting of a plurality of uprights 38. The uprights 38 are suitably connected to laterally extending angles 39, supported on the supporting structure 11. The upper ends of the uprights 38 are connected by angle members 40 having blocks 41 connected thereto. A bracket 42 is suitably connected to the blocks 41. A fluid-extensible device, generally designated at 43, is suitably supported on the bracket 42. The extensible device 43 comprises a cylinder 44 having a suitable fluid-inlet connection 45. A rod 46 extends outwardly from the cylinder 44, the said rod being suitably connected to a piston 45' within the cylinder 44. An annular support plate, or gripper support, 47 is provided with a central opening 48 through which the rod 46 projects. The rod 46 may move relative to the support plate 47, but the support plate 47 is normally supported on the rod 46 by means of a washer 49 suitably connected to the rod by means of nuts 50.

The support plate 47 is provided with a plurality of circumferentially disposed notches 51. A plurality of arms 52 are positioned within the notches 51, each of the arms 52 comprising a vertical member 53 disposed below the support plate 47. Each vertical member 53 is also provided with a gripping portion, or edge, 54. The vertical members 53 are also connected to laterally extending members 55, the said members extending inwardly toward the rod 46. Each of the laterally extending members 55 is provided with its innermost portion with an engageable member, or pivot portion, 56. Each of the arms is pivotally connected within each notch 51 by means of a pivot pin 57 suitably connected to the support plate 47, as shown in Figure 3.

A collar 58 is connected to the rod 46 by means of a pin 59 for movement with said rod. A sleeve 60 is suitably fixed to the plate 47, the sleeve 60 surrounding the rod 46 and being movable with said plate 47 relative to said rod 46.

A pair of stop rods 61 are connected to the support plate 47, the rods 61 extending through openings 62 provided in the bracket 42. The rods 61 have disposed at their upper ends stop nuts 63, which engage the bracket 42 for limiting the downward movement of the support plate 47. As specifically shown in Figure 5, and more generally shown in Figure 2, a stop slide, generally indicated at 64, is provided on the support plate 47. The stop slide 64 includes a slidable member 65 having a stop element 66 connected thereto. The slidable member 65 is slidable in a slot 67 provided in the underneath side of the support plate 47. The slidable member 65 is also suitably connected to a guide member 68 which, in turn, has a handle 69 connected thereto.

The operation

In the manufacture of torque-converter castings, it is necessary to position a plurality of individual core elements on a mold drag, these core elements, or segments, in turn, having spaces therebetween which during casting form the vanes, or blades, of the turbines or torque-converter shells. As indicated above, the core segments generally consist of a plaster material, which must be handled very gently and which must be properly treated because of its frangible nature in the assembled core form. The core elements 35 are thus placed upon the assembly fixture 22, with the arcuate recesses 35' suitably mated with the arcuate projections 24. After the mold sections 35 have thus been placed upon the assembly fixture 22, the operator pours a quantity of plaster material into a central opening 70, formed by the end portions of the positioned mold sections 35. The material thus poured into the opening 70, as best shown in Figure 4, then hardens and suitably ties all of the mold sections together by means of a plug 71. Hence, the individual mold cores, or elements, 35 are now connected together in a unitary, or assembled, structure. While the mold cores are assembled on the fixture 22, the platform 16 is in the dotted-line position, as indicated in Figure 1. After the mold sections have thus been interconnected, the platform 16 is moved ot the left, as shown in Figure 1, until the assembly fixture 22 is positioned underneath the lifting device 36. It is now desired to raise the assembled mold by the utilization of the lifting device 36.

Air under pressure is now delivered to the cylinder 31, causing the piston 32 to move upwardly, raising the stripper plate 25, thus stripping the mold sections in an assembled manner from the arcuate projections 24. The fluid-extensible device 43 is now set in operation. The ram, or rod, 46 now moves downwardly until the stop nuts 63 engage the bracket 42, whereupon the support plate 47 stops its downward movement. The rod 46 continues downward movement until the collar 58 abuts the sleeve 60. This continued downward movement of the collar 58 causes the pivotal movement of the vertical members 53, so that the gripping portions 54 are moved radially, outwardly with respect to the axis of the rod 46. Since the gripping edges 54 are now disposed outwardly of the mold sections 35, the said gripping portions 54 are free of the mold, but the support plate 47 is positioned immediately above the said mold.

The fluid-extensible device 43 is now actuated so that the rod 46 moves upwardly. The rod 46 moves freely upwardly, without moving the plate 47, until the sleeve 49 engages the underneath side of the plate 47. During this time of limited movement, the collar 58 has been moved upwardly, whereupon the pivot portions 56 are engaged so that the arms 55 pivot and the gripping portions 54 are moved inwardly into engagement with the outer periphery of the assembled mold. The mold, or assembled core portions, are now securely gripped with equal pressure on all opposite sides, though the said gripping action is gentle and will not damage the molds. Continued upward movement of the rod 46 now lifts the complete assembled core, or mold, free of the assembly fixture 22, so that, as best shown in Figure 3, the mold is disposed above the platform 16.

Referring now to Figure 5, it can be seen that when the member 68 is moved inwardly by the operator, that the stop member 66 can be disposed between the washer 49 and the plate 47. Thus, when the collar 58 is moved downwardly into abutting position with respect to the sleeve 60, and the rod 46 is moved downwardly so that the washer 49 moves away from the underneath side of the support plate 47, movement of the stop member 66 into this space locks the collar 58 tightly against the sleeve 60. This stop slide 64 is, then, for the purpose of keeping the arms 65 so positioned that the gripping portions 54 are disposed away and outwardly from the assembled mold. In this position, then, the plate 47 may be raised and lowered relative to the mold, without the gripping portions 53 functioning to grasp the mold carried on the assembly fixture.

After the assembled mold has been lifted free of the assembly fixture 22, as shown in Figure 3, the platform 16 is moved to the right until the drag 20 is positioned immediately below the lifting device. The support plate 47 is now lowered, and the assembled mold is positioned within the recess 21 of the drag 20. As the mold is now deposited on the drag 20, the rod 46 moves downwardly to position the washer 49 a distance slightly below the plate 47, thus causing the vertical members 53 and gripping members 54 to move, or pivot, outwardly relative to the mold. The slidable member 65 is now actuated to insert the stop member 66 between the washer 49 and the support plate 47, so that the gripping portions 54 are disposed in the non-use position. Now the support plate 47 may be moved upwardly, free of the deposited mold, and the drag 20 may be transported to its casting position.

Thus it can be seen that an improved mold or core-handling device has been described. The term "mold" and "core" are used interchangeably, since the device is suitable for handling any type of mold, or core, in its transition from the assembly fixture to the positioning of the same on the mold unit, whether it be a mold drag or mold container. It is believed that the objects have been fully achieved in the device shown and described, and it must be understood that changes and modifications may be made without departing from the spirit of the invention as disclosed or the scope thereof as defined in the appended claims.

What is claimed is:

1. An apparatus for handling foundry molds and the like comprising: a support, a horizontal track mounted on said support, a platform movably positioned on said support, a mold drag on said platform, a mold assembly fixture on said platform, said mold assembly fixture comprising a base member connected to said platform, said base member having projections thereon generally conforming to recessed portions of a plurality of mold segments for spacing and retaining said segments relative to each other on said platform, a stripper plate on said base member, said stripper plate being adapted to support said mold segments, said stripper plate having openings through which said projections project, a fluid-pressure extensible device connected to said base member, said device including a cylinder, a piston within said cylinder, a piston arm connecting said piston and said stripper plate, said piston being movable by fluid pressure within said cylinder for raising said stripper plate to move the mold segments free of said projections, a frame disposed above said assembly fixture; a lifting device carried by said frame, said lifting device comprising: a second fluid-pressure extensible device comprising a second cylinder connected to said frame, a second piston reciprocally positioned in said second cylinder, a second piston rod connected to said second piston, a support plate carried by said second piston rod, said second rod being movable axially relative to said support plate, a sleeve encircling said second piston rod, said second sleeve being connected to said support plate and being movable therewith relative to said second piston rod, a collar connected to said second piston rod for movement therewith, a plurality of L-shaped gripper arms circumferentially spaced and supported on said support plate, each of said arms including a vertical member disposed below said support plate and a lateral member connected to the vertical member and disposed above said support plate, means pivotally connecting said arms to said support plate, said lateral member being engageable by said collar to move said vertical arm toward and away from an assembled mold supported on said fixture during reciprocation of said second piston rod, said collar being engageable with said sleeve for limiting the axial movement of said second piston rod relative to said support plate whereby said vertical arms are moved laterally outwardly relative to an assembled mold during downward travel of said second piston rod, and said arms are moved inwardly for gripping an assembled mold during upward travel of said second piston rod whereby said mold is removed from said fixture, said platform being movable to position said drag beneath said lifting device and to receive said mold therefrom during downward travel of said second piston rod.

2. An apparatus for handling foundry molds and the like comprising: a support, a horizontal track mounted on said support, a platform movably positioned on said support, a mold drag on said platform, a mold assembly fixture on said platform, said mold assembly fixture comprising a base member connected to said platform, said base member having projections thereon generally conforming to recessed portions of a plurality of mold segments for spacing and retaining said segments relative to each other on said platform, a stripper plate on said base member, said stripper plate being adapted to support said mold segments, said stripper plate having openings through which said projections project, a first fluid-pressure extensible device connected to said base member and said stripper plate, said first fluid-pressure extensible device being operable to raise said stripper plate to move the mold segments free of said projections, a frame disposed above said assembly fixture; a lifting device carried by said frame, said lifting device comprising: a second fluid-pressure extensible device including a reciprocable piston rod, a support plate movably carried by said rod, said rod being movable relative to said support plate, a sleeve encircling said piston rod, said sleeve being connected to said support plate and being movable therewith relative to said piston rod, a collar connected to said piston rod for movement therewith, a plurality of L-shaped gripper arms circumferentially spaced and supported on said support plate, each of said arms including a vertical member disposed below said support plate and a lateral member connected to the vertical member and disposed above said support plate, means pivotally connecting said arms to said support plate, said lateral member being engageable by said collar to move said vertical arm toward and away from an ssembled mold supported on said fixture during reciprocation of said piston, said collar being engageable with said sleeve for limiting the axial movement of said piston rod relative to said support plate whereby said vertical arms are moved laterally outwardly relative to an assembled mold during downward travel of said piston rod, and said arms are moved inwardly for gripping an assembled mold during upward travel of said piston rod whereby said mold is removed from said fixture, said platform being movable to position said drag beneath said lifting device and to receive said mold therefrom during downward travel of said piston rod.

3. An apparatus for handling foundry molds and the like comprising: a horizontal track, a platform movably positioned on said track, a mold drag on said platform, means adapted to support a mold on said platform adjacent said drag, a frame disposed above said platform; a lifting device carried by said frame, said lifting device comprising: a fluid-pressure extensible device comprising a cylinder connected to said frame, a piston reciprocally positioned in said cylinder, a piston rod connected to said piston, a support plate carried by said piston rod, said rod being movable axially relative to said support plate, a sleeve encircling said piston rod, said sleeve being connected to said support plate and being movable therewith relative to said piston rod, a collar connected to said rod for movement therewith, a plurality of L-shaped gripper arms circumferentially spaced and supported on said support plate, each of said arms including a vertical member disposed below said support plate and a lateral member connected to the vertical member and disposed above said support plate, means pivotally connecting said arms to said support plate, said lateral member being engageable by said collar to move said vertical arm toward and away from an assembled mold supported on said fixture during reciprocation of said piston, said collar being engageable with said sleeve for limiting the axial movement of said piston relative to said support plate whereby said vertical arms are moved laterally outwardly relative to an assembled mold during downward travel of said piston, and said arms are moved inwardly for gripping an assembled mold during upward travel of said piston whereby said mold is removed from said fixture, said platform being movable to position said drag beneath said lifting device and to receive said mold therefrom during downward travel of said piston.

4. An apparatus for handling foundry molds and the like comprising: a support, a platform movably positioned on said support, a mold drag on said platform, a mold supported on said platform adjacent said drag, a frame disposed above said platform; a lifting device carried by said frame, said lifting device comprising: a power-actuated reciprocable rod movably carried by said frame, a support plate carried by said rod, said rod being movable axially relative to said support plate, a sleeve encircling said rod, said sleeve being connected to said support plate and being movable therewith relative to said rod, a collar connected to said rod for movement therewith, a plurality of L-shaped gripper arms circumferentially spaced and supported on said support plate, each of said arms including a vertical member disposed below said support plate and a lateral member connected to the vertical member and disposed above said support plate, means pivotally connecting said arms to said support plate, said lateral member being engaged by said collar to move said vertical arm toward and away from an assembled mold supported on said fixture during reciprocation, said collar being engageable with said sleeve for limiting the axial movement of said rod relative to said support plate whereby said vertical arms are moved laterally outwardly relative to an assembled mold during downward travel of said rod, and said arms are moved inwardly for gripping an assembled mold during upward travel of said rod whereby said mold is removed from said fixture, said platform being movable to position said drag beneath said lifting device and to receive said mold therefrom during downward travel of said rod.

5. An apparatus for handling foundry molds and the like comprising: a support, a mold drag on said support, a mold assembly fixture on said support, said mold assembly fixture comprising a base member, said base member having projections thereon generally conforming to recessed portions of a plurality of mold segments for spacing and retaining said segments relative to each other on said platform, a stripper plate on said base member, said stripper plate being adapted to support said mold segments, said stripper plate having openings through which said projections project, first fluid-pressure means connected to said stripper plate, said first fluid-pressure means being operable to move said stripper plate to raise the mold segments free of said base member, a frame disposed above said assembly fixture; a lifting device carried by said frame, said lifting device comprising: a second fluid-pressure means, a ram connected to said second fluid-pressure means and adapted to be reciprocated thereby, a support plate connected to said ram for reciprocation therewith, a plurality of gripper arms circumferentially spaced and supported on said support plate, each of said arms including a first member disposed below said support plate and a second member connected to the first member and disposed above said support plate, means pivotally connecting said arms to said support plate, and means engageable with said arms and responsive to movement of said ram for moving said first members inwardly to grip a mold supported on said assembly fixture whereby said mold may be raised and deposited on said mold drag.

6. An apparatus for handling foundry molds comprising: a platform, a mold assembly fixture supported on said platform, said fixture comprising a base member including positioning means for retaining a plurality of individual mold sections in relatively fixed relation, a stripper plate supported on said base member, means for raising said stripper plate to lift the mold sections free of said positioning means, a frame disposed above said fixture, said frame including a vertically reciprocable ram, a support plate carried by said ram for movement therewith, said plate being relatively axially movable relative to said ram, a plurality of arms pivotally connected to said plate, each of said arms including gripping portions, a collar fixedly connected to said ram for movement therewith, said collar being engageable with said arms for moving said gripping portions inwardly and outwardly during relative movement of said plate with respect to said ram, and means for limiting the relative movement of said plate and ram including a sleeve disposed between said collar and said plate, said gripping members being movable outwardly relative to the mold sections disposed on said fixture during a movement of said ram in a first direction, said gripping members being movable inwardly during movement of said ram in a second direction whereby said gripping members engage said molds and raise the same relative to said fixture.

7. An apparatus for handling foundry molds comprising: a platform, a mold assembly fixture supported on said platform, said fixture comprising a base member including positioning means for retaining a plurality of individual mold sections in relatively fixed relation, a stripper plate supported on said base member, means for raising said stripper plate to lift the mold sections free of said positioning means, a frame disposed above said fixture, said frame including a vertically reciprocable ram, a support plate carried by said ram for movement therewith, said plate being relatively axially movable relative to said ram, a plurality of arms pivotally connected to said plate, each of said arms including gripping portions, a collar fixedly connected to said ram for movement therewith, said collar being engageable with said arms for moving said gripping portions inwardly and outwardly during relative movement of said plate with respect to said ram, and means for limiting the relative movement of said plate and ram including a stop member disposed between said collar and said plate, said gripping members being movable outwardly relative to the mold sections disposed on said fixture during a movement of said ram in a first direction, said gripping members being movable inwardly during movement of said ram in a second direction whereby said gripping members engage said molds and raise the same relative to said fixture.

8. An apparatus for handling foundry molds comprising: a platform, a mold assembly fixture supported on said platform, said fixture comprising a base member including positioning means for retaining a plurality of individual mold sections in relatively fixed relation, a stripper plate supported on said base member, means for raising said stripper plate to lift the mold sections free of said positioning means, a frame adjacent said fixture, said frame including a vertically reciprocable ram, a support plate carried by said ram for movement therewith, said plate being relatively axially movable relative to said ram, a plurality of arms movably connected to said plate, each of said arms including gripping portions, actuating means connected to said ram for movement therewith, said actuating means being engageable with said arms for moving said gripping portions inwardly and outwardly during relative movement of said plate with respect to said ram, and means for limiting the relative movement of said plate and ram including a stop member disposed between said collar and said plate, said gripping members being movable outwardly relative to the mold sections disposed on said fixture during a movement of said ram in a first direction, said gripping members being movable inwardly during movement of said ram in a second direction whereby said gripping members engage said molds and raise the same relative to said fixture.

9. An apparatus for handling foundry molds comprising: a platform, a mold assembly fixture supported on said platform, said fixture comprising a base member for retaining a plurality of individual mold sections in relatively positioned relation, a stripper plate engageable with said mold sections, means for raising said stripper plate to lift the mold sections free of said base member, a frame adjacent said fixture, said frame including a vertically reciprocable ram, a gripper support carried by said ram for movement therewith, said gripper support being relatively axially movable relative to said ram, a plurality of arms movably connected to said gripper support, each of said arms including gripping portions, and actuating means on said ram engageable with said arms for moving said gripping portions inwardly and outwardly during relative movement of said plate with respect to said ram, said gripping members being movable outwardly relative to the mold sections disposed on said fixture during a movement of said ram in a first direction, said gripping members being movable inwardly during movement of said ram in a second direction whereby said gripping members engage said molds and raise the same relative to said fixture.

10. An apparatus for handling foundry molds comprising: a frame, a platform associated with said frame, a fluid-pressure cylinder supported on said frame, a ram connected to said cylinder for relative reciprocation in a direction toward and away from said platform, a circular plate having an opening, said ram having an end portion extending through said opening, means on said end portion supporting said plate on said ram, a plurality of arms circumferentially disposed and pivotally supported on said plate, said arms having gripping portions at one end and engageable portions of their other ends, a collar fixedly carried by said ram, said collar being adapted to engage said engageable portions for pivoting said arms, a sleeve encircling said ram, said sleeve being disposed below said collar and being connected to said plate, a stop means connected to said plate, said stop means being movable with said plate and being engageable with a portion of said frame for limiting the downward movement of said plate, said collar being movable downwardly with said ram, to engage said sleeve during the lowermost position of said plate, whereby said gripping portions are moved outwardly relative to the axis of said ram to a non-gripping position, said collar being movable upwardly with said ram for moving said gripping members inwardly to grip a mold supported on said platform, and means locking said gripping members in the non-gripping position.

11. An apparatus for handling foundry molds comprising: a frame, a platform associated with said frame, actuating means supported on said frame, a ram connected to said actuating means for relative reciprocation in a direction toward and away from said platform, a plate having an opening, said ram extending through said opening and supporting said plate, a plurality of arms circumferentially disposed and pivotally supported on said plate, said arms having gripping portions at one end and engageable portions at their other ends, a collar fixedly carried by said ram, said collar being adapted to engage said engageable portions for pivoting said arms, a sleeve encircling said ram, said sleeve being disposed below said collar and being connected to said plate, a stop means connected to said plate, said stop means being movable with said plate and being engageable with a portion of said frame for limiting the downward movement of said plate, said collar being movable downwardly with said ram, to engage said sleeve during the lowermost position of said plate, whereby said gripping portions are moved outwardly relative to the axis of said ram to a non-gripping position, said collar being movable upwardly with said ram for moving said gripping members inwardly to grip a mold supported on said platform, and means locking said gripping members in the non-gripping position.

12. An apparatus for handling foundry molds comprising: a frame, a platform associated with said frame, actuating means supported on said frame, a ram connected to said actuating means for relative reciprocation in a direction toward and away from said platform, a plate having an opening, said ram extending through said opening and supporting said plate, a plurality of arms circumferentially disposed and pivotally supported on said plate, said arms having gripping portions, a collar fixedly carried by said ram, said collar being adapted to engage said arms for pivoting said arms, a sleeve encircling said ram, said sleeve being disposed below said collar and being connected to said plate, a stop means connected to said plate, said stop means being movable with said plate and being engageable with a portion of said frame for limiting the downward movement of said plate, said collar being movable downwardly with said ram, to engage said sleeve during the lowermost position of said plate, whereby said gripping portions are moved outwardly relative to the axis of said ram to a non-gripping position, said collar being movable upwardly with said ram for moving said gripping members inwardly to grip a mold supported on said platform, and means locking said gripping members in the non-gripping position.

13. An apparatus for handling foundry molds comprising: a frame, a platform associated with said frame, actuating means supported on said frame, a ram connected to said actuating means for relative reciprocation in a direction toward and away from said platform, a plate having an opening, said ram extending through said opening and supporting said plate, a plurality of arms circumferentially disposed and pivotally supported on said plate, said arms having upper portions above said plate and lower gripping portions disposed below said plate, means on said ram engageable with said upper portions of said arms during movement of said ram for pivoting said arms, a stop means connected to said plate, said stop means being movable with said plate and being engageable with a portion of said frame for limiting the downward movement of said plate, said ram being movable further downwardly relative to said plate to pivot said arms, whereby said gripping portions are moved outwardly relative to the axis of said ram to a non-gripping position, said ram being movable upwardly for moving said arms whereby said gripping members move inwardly to grip a mold supported on said platform, and means locking said gripping members in the non-gripping position.

14. An apparatus for handling foundry molds comprising: a frame, a platform associated with said frame, actuating means supported on said frame, a ram connected to said actuating means for relative reciprocation in a direction toward and away from said platform, a plate having an opening, said ram extending through said opening and supporting said plate, a plurality of arms circumferentially disposed and pivotally supported on said plate, said arms having upper portions disposed above said plate and lower gripping portions disposed below said plate, means on said ram engageable with said upper portions of said arms during movement of said ram for pivoting said arms, and stop means connected to said plate, said stop means being movable with said plate and being engageable with a portion of said frame for limiting the downward movement of said plate, said ram being movable further downwardly relative to said plate to pivot said arms, whereby said gripping portions are moved outwardly relative to the axis of said ram to a non-gripping position, said ram being movable upwardly for moving said arms whereby said gripping members move inwardly to grip a mold supported on said platform.

References Cited in the file of this patent

UNITED STATES PATENTS

| Number | Name | Date |
|---|---|---|
| 55,504 | Lamb | June 12, 1866 |
| 745,649 | McWane | Dec. 1, 1903 |
| 1,274,752 | Norcross | Aug. 6, 1918 |
| 1,277,745 | Nicholls | Sept. 3, 1918 |
| 1,575,185 | Stenhouse | Mar. 2, 1926 |
| 1,935,739 | Freese | Nov. 21, 1933 |
| 2,615,588 | Gedris | Oct. 28, 1952 |
| 2,663,919 | Lentz | Dec. 29, 1953 |